United States Patent
Denike et al.

(10) Patent No.: US 10,362,846 B2
(45) Date of Patent: Jul. 30, 2019

(54) PROTECTIVE CASE WITH OVER-CENTER FLAP CLOSURE AND STYLUS HOLDER

(71) Applicant: Samsonite IP Holdings S.àr.l., Luxembourg (LU)

(72) Inventors: Kendall Robert Denike, San Francisco, CA (US); Syed Riaz Ahmed, San Leandro, CA (US); Randy Chiang, San Francisco, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 391 days.

(21) Appl. No.: 15/203,573

(22) Filed: Jul. 6, 2016

(65) Prior Publication Data
US 2017/0188676 A1 Jul. 6, 2017

Related U.S. Application Data

(63) Continuation-in-part of application No. 14/989,679, filed on Jan. 6, 2016, now abandoned.

(51) Int. Cl.
*B65D 85/00* (2006.01)
*A45C 11/00* (2006.01)
(Continued)

(52) U.S. Cl.
CPC .......... *A45C 11/00* (2013.01); *A45C 13/1069* (2013.01); *A45C 13/1076* (2013.01);
(Continued)

(58) Field of Classification Search
CPC ........ A45C 2011/003; A45C 2011/002; A45C 2011/001; B65D 85/00
(Continued)

(56) References Cited

U.S. PATENT DOCUMENTS 1,510,429 A * 9/1924 Watson ................... A24F 15/12
206/261
7,270,255 B2 * 9/2007 Badillo .................... A45C 9/00
224/191
(Continued)

FOREIGN PATENT DOCUMENTS

WO WO 2007/120254 A2 10/2007

OTHER PUBLICATIONS

CaseCrown Vertical Neoprene Skin (Orange) for iPad Air, http://www.amazon.com/CaseCrown-Vertical-Neoprene-SkinOrange/dp/B00GR8KWCA/ref=sr_1_4?srs=2529121011&ie=UTF8&qid=1460464654&sr=8-4&keywords=neoprene ), Dec. 12, 2013.

*Primary Examiner* — King M Chu
(74) *Attorney, Agent, or Firm* — Lerner, David, Littenberg, Krumholz & Mentlik, LLP

(57) ABSTRACT

There is provided a case (1) for a device (22) comprising a sleeve portion (4) having a sleeve opening (17), a closure portion (6), and a hinge (8) connecting the closure portion (6) to the sleeve portion (4) adjacent the sleeve opening (17). A stylus cavity is formed within the sleeve portion. The opening of the stylus cavity is adjacent the sleeve opening. The hinge (8) is adapted to allow the closure portion (6) to move from a first position away from the sleeve opening and stylus cavity opening to allow the device (22) to be inserted into the sleeve portion (4) and the stylus to be inserted into the stylus cavity and a second position where the closure portion (6) is positionable over an end of the device (22) and over the stylus cavity opening.

37 Claims, 22 Drawing Sheets

(51) Int. Cl.
  *A45C 13/10* (2006.01)
  *G06F 3/039* (2013.01)
  *A45C 11/36* (2006.01)
  *A45C 13/02* (2006.01)

(52) U.S. Cl.
  CPC .............. *G06F 3/039* (2013.01); *A45C 11/36* (2013.01); *A45C 13/02* (2013.01); *A45C 2011/002* (2013.01); *A45C 2011/003* (2013.01); *A45C 2013/1015* (2013.01)

(58) Field of Classification Search
  USPC ........................................ 206/320, 261, 262
  See application file for complete search history.

(56) References Cited

U.S. PATENT DOCUMENTS

| | | | | |
|---|---|---|---|---|
| 7,673,745 | B2* | 3/2010 | Sirichai | A45C 11/00 206/320 |
| 2003/0070947 | A1* | 4/2003 | Motson | A45F 5/00 206/320 |
| 2005/0199517 | A1* | 9/2005 | Petrucci | B65D 5/4291 206/261 |
| 2005/0224375 | A1* | 10/2005 | Focke | B65D 85/1045 206/259 |
| 2005/0252796 | A1* | 11/2005 | Sendo | B65D 85/1045 206/261 |
| 2010/0300909 | A1* | 12/2010 | Hung | H04M 1/04 206/320 |
| 2012/0118769 | A1* | 5/2012 | Conner | A45C 11/00 206/320 |
| 2015/0272303 | A1* | 10/2015 | Brown | G06F 1/1656 224/191 |

* cited by examiner

PROTECTIVE CASE WITH OVER-CENTER FLAP CLOSURE AND STYLUS HOLDER

The current application is a continuation-in-part of U.S. patent application Ser. No. 14/989,679 filed on Jan. 6, 2016.

FIELD OF THE INVENTION

The present invention relates to a protective case for a mobile device formed from a sleeve and a hinged closure that protects the device from impact and that securely maintains the device within the sleeve More particularly, the present invention relates to a protective case with a hinged closure that fits over an end of a device within the case. In another embodiment, the protective case includes a protective compartment to hold a stylus.

It is noted that citation or identification of any document in this application is not an admission that such document is available as prior art to the present invention.

Cases for mobile devices have been designed to provide at least some protection from impact events, such as when the device is dropped, hit, or otherwise struck. One type of case, referred to as a sleeve, is designed to fit over personal devices such as laptop computers and electronic tablets. The device is slipped into an opening at an end of the sleeve. A lid closes the opening of the sleeve. The lid typically comprises a simple flap that covers the opening to the sleeve. An engagement element, such as a magnetic latch, may hold the lid closed against a further portion of the sleeve (or device) or the end of the flap may simply be tucked into the sleeve between the device and sleeve to maintain the device within the sleeve. The addition of such engagement elements to the sleeve increases the complexity of manufacturing the sleeve, adds to cost, and increase the weight of the sleeve. Magnetic latches can also impact the performance of a device, such as damaging hard drives and accidentally activating sleep/wake functions. A flap arrangement on its own is generally not as secure and may easily open, and tucking the flap in may be difficult and inconvenient in use.

Mobile devices often are equipped with a stylus for inputting information to the device by handwriting and for entering sketches and other artwork. The stylus include mechanical parts and electronic circuits that can be damaged if the stylus is subject to mechanical shock or impact. The stylus can also be damaged by contact with liquids and dust and can be marred if it contacts an abrasive surface. The stylus includes a nib for contacting the screen of the device. This nib may incorporate sensors to detect the force applied to the stylus against the screen. Output from these sensors is used by the device to emulate the effect of artists tool, for example, a calligraphy pen, a paint brush, or a charcoal pencil. Such sensors are highly sensitive. These sensors, as well as the nib of the stylus may also be very delicate. Inadvertent contact between the stylus and other objects can damage the nib, the sensors, or other parts of the stylus. Thus, it would be desirable to provide a convenient means for storing a stylus along with the mobile device that protects the stylus from inadvertent contact with objects and surfaces and provide protection from liquids and dust.

Cases for mobile devices have been designed with pockets to hold accessories for mobile devices. These pockets are located on the outside of the case and are large enough to accommodate equipment such as pointing devices, power cords, and the like. The pockets provided on cases for mobile devics are generally much larger than a stylus. As a result, when a stylus is placed in such a pocket, it can slide around. Contact between the stylus and other objects in the pocket, as well as contact between the nib of the stylus and the sides of the pocket can result in damage to the stylus. Even where smaller external pockets designed specifically for a stylus are provided, these pockets still expose the stylus to impacts when the case contacts another object.

It is therefore desirable to provide an improved case for a device which addresses the above described problems and/or which more generally offers improvements or an alternative to existing arrangements. In particular, but not exclusively it is desirable to provide a new sleeve-type case for an electronic device that securely maintains the device within the case without the need for engagement elements, that provides improved impact protection, and that allows the user to easily remove the device from the sleeve when desired. It is also desirable to provide a secure, protective enclosure of a stylus that is easily accessed when the user accesses the device.

It is noted that in this disclosure, and particularly in the claims, terms such as "comprises", "comprised", "comprising" and the like can have the meaning attributed to it in U.S. Patent law; that is, they can mean "includes", "included", "including", and the like; and that terms such as "consisting essentially of" and "consists essentially of" have the meaning ascribed to them in U.S. Patent law, that is, they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112), such that applicant(s) reserve the right to disclaim, and hereby disclose a disclaimer of, any previously described product, method of making the product, or process of using the product.

SUMMARY OF THE INVENTION

The present invention relates to a protective case with a hinged closure that fits over an end of a device within the case where the closure is held closed by an over-center interference between the device and the closure and with an impact absorbing bumper arranged on an interior perimeter of the case According to the present invention there is therefore provided a case as described in the accompanying claims.

In an embodiment of the invention there is provided a case for a device comprising a sleeve portion having a sleeve opening, a closure portion, and a hinge connecting the closure portion to the sleeve portion adjacent the sleeve opening. The hinge is adapted to allow the closure to move from a first position away from the sleeve opening to allow the device to be inserted into the sleeve portion and a second position where the closure portion is positionable over an end of the device. Movement of the hinge from the first position to the second position causes the closure portion to pass over an end of the device to form an over-center engagement with the end of the device.

In another embodiment of the invention such a case is provided with a bumper arranged along a portion of an inner peripheral side of the sleeve portion and/or the closure portion. The bumper may have a plurality of protrusions that contact an edge of the device. These protrusions may have a shape that attenuates mechanical impact communicated to the device such as a triangular or pyramidal shape. The bumper may extend along the entire inner periphery of the sleeve and closure. The bumper may be formed from one or more of an injection molded foam, die cut foam, compression molded foam, injection molded rubber, co-molded rubber, and hard plastic.

According to a further embodiment of the invention, such a case includes latching components to removeably connect the closure portion to the sleeve portion when the hinge is in the second position. The latching components may include a magnetic latch, a snap, a buckle, and/or hook-and-loop panels.

According to a still further embodiment of the invention, there is provided a case for a device and a stylus comprising a sleeve portion having a sleeve opening, a stylus cavity located within the sleeve portion, the stylus cavity having a stylus cavity opening adjacent the sleeve opening, a closure portion, and a hinge connecting the closure portion to the sleeve portion adjacent the sleeve opening and the stylus cavity opening, the hinge adapted to allow the closure portion to move from a first position away from the sleeve opening and stylus cavity opening to allow the device to be inserted into the sleeve portion and the stylus to be inserted into the stylus cavity and a second position where the closure portion is positioned over the sleeve opening and stylus cavity opening.

According to a further embodiment, the case is comprised of a front sleeve panel and the rear sleeve panel. The front and rear sleeve panels may be formed from a compliant material or a rigid material or a combination of compliant and rigid materials.

BRIEF DESCRIPTION OF THE DRAWINGS

FIG. 5b shows a rear perspective view of the embodiment shown in FIG. 5a;

FIG. 5c shows a side perspective view of the embodiment shown in FIG. 5a;

FIG. 8b shows a rear perspective view of the embodiment shown in FIG. 8a;

FIG. 8c shows a detailed side perspective view of the embodiment shown in FIG. 8a:

FIG. 9b shows a side view of the embodiment shown in FIG. 9a;

FIG. 9c shows a front perspective view of the embodiment shown in FIG. 9a:

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements that are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

Figure 1:
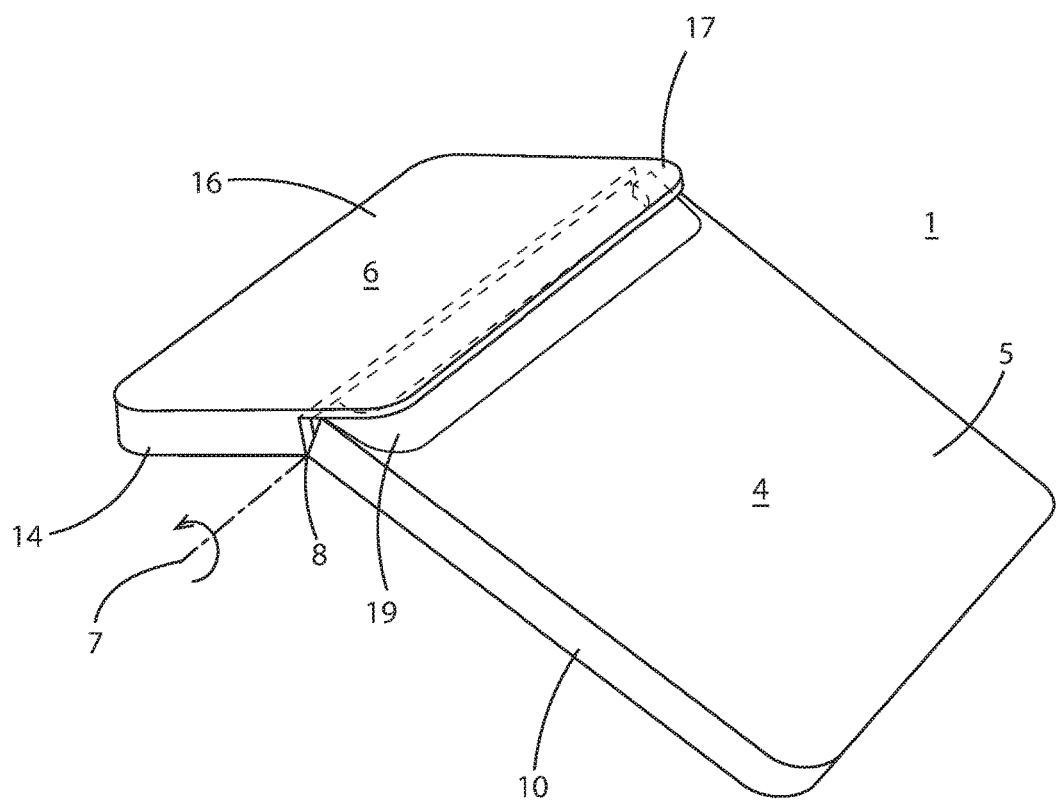
FIG. 1 shows a perspective view of a case 1 according to an embodiment of the invention.
Figure 2:
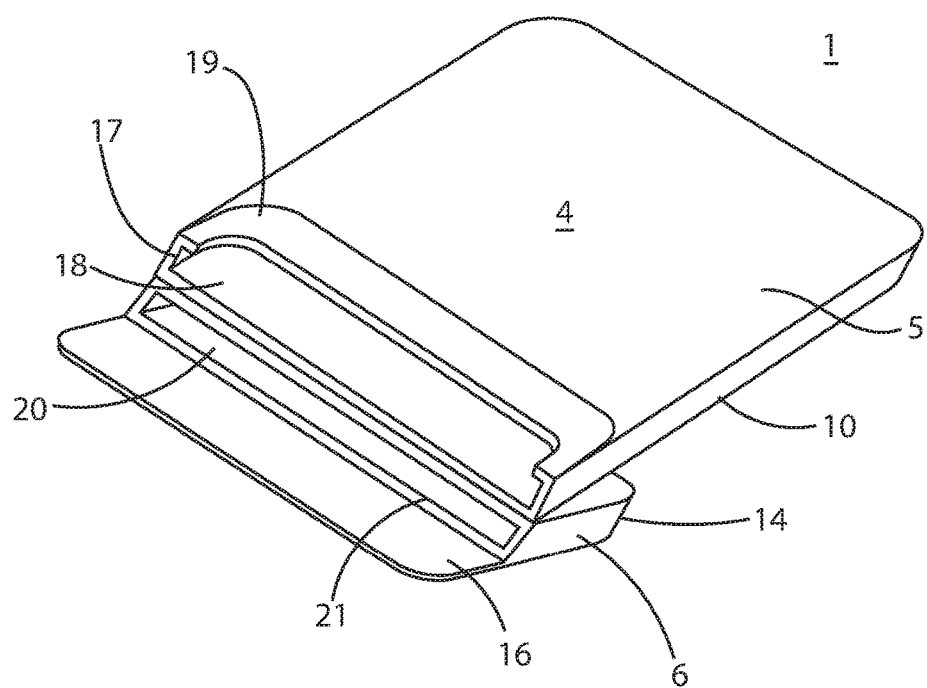
FIG. 2 shows another perspective view of a case according to the embodiment of the invention shown in FIG. 1.

FIG. 1 shows a sleeve-type case according to an embodiment of the invention. The case 1 includes a sleeve portion 4 and a closure portion 6 connected by a hinge 8. The closure portion is moveable with respect to the sleeve portion 4 about the axis 7 of the hinge 8. The closure portion 6 includes a front closure panel 16 and a rear closure member 14. The sleeve portion 4 is formed by a front sleeve panel 5 and a rear sleeve member 10. The hinge 8 connects the closure portion 6 along one edge of the rear closure member 14 with the sleeve 4 along one edge of the rear sleeve member 10 adjacent to the opening 17 of the sleeve 4, as shown in FIG. 2. The front closure panel 16 is longer than rear closure member 14, creating a closure engagement 17. When the case is closed, as will be explained below, closure engagement 17 is adjacent the front sleeve panel 5 at sleeve engagement 19.

FIG. 2 shows another view of the case of FIG. 1, with the closure portion 6 rotated about the axis of hinge 8 away from the sleeve portion 4. The front sleeve panel 5 and the rear sleeve member 10 form a first cavity 18 and sleeve opening 17. The front closure panel 16 and the rear closure member 14 form a second cavity 20 with a closure opening 21. When the case is closed the first cavity 18 and second cavity 20 form an enclosure sized and shaped to hold a device, such as a laptop computer, an electronic tablet, a cell phone, and the like.

FIGS. 1 and 2 show a preferred embodiment wherein the axis 7 of hinge 8 traverses the shorter dimension of the rectangular case, wherein the device is inserted lengthwise into the case, and wherein the closure portion 6 fits over a short edge of the device. According to another embodiment, the axis of the hinge traverses the longer dimension of the rectangular case. According to this embodiment, the device is inserted width-wise into the case and the closure portion fits over a long edge of the device.

Figure 3A:
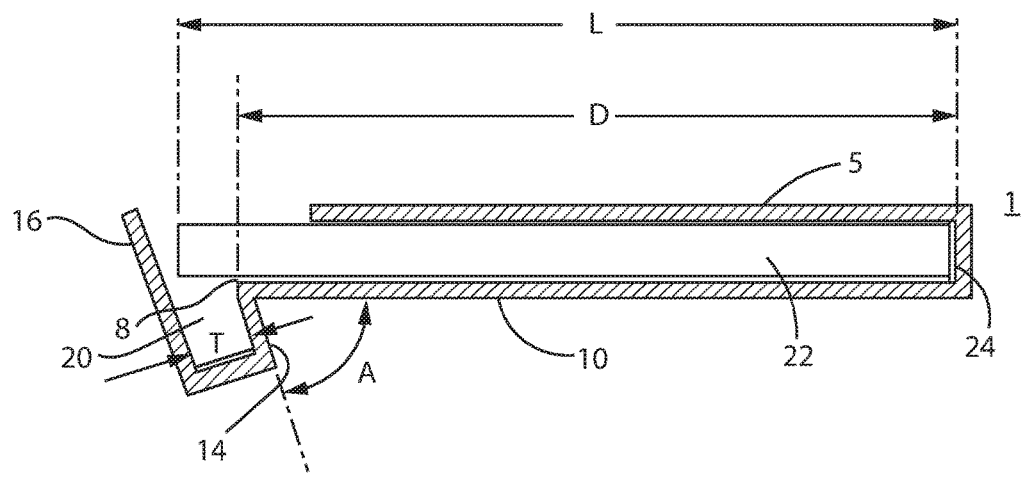
FIGS. 3a-3d show cross sectional views of the case according to the embodiment shown in FIG. 1.

FIG. 3a shows a cross section of the case 1 of FIG. 1 with an electronic device 22 inserted into the first cavity 18 of the sleeve portion 4. The length L of the electronic device is greater than the distance D from the hinge 8 to the bottom interior end of the first cavity 18 in the longitudinal direction so that, when the device 22 in inserted, a portion of the device protrudes from the first cavity by a distance L minus D. The closure portion 6 is shown rotated about the axis of hinge 8 so that the inside surface of the front closure panel 16 contacts the protruding end of the device. The closure portion 6 is at an angle A with respect to the sleeve 4. The distance T is the thickness dimension of the second cavity 20.

The bottom interior end of the first cavity 18 includes a bumper 24, as will be discussed below. According to one aspect of the invention, the bumper 24 is formed from a resilient material. Increasing angle A by rotating the closure 6 about the hinge 8 causes the point where the inside of the front closure panel 16 contacts the device 22 to move closer to the bottom end of the first cavity 18. This applies a force along the longitudinal axis of the device 22, causing the device to press against the resilient bumper 24 and be displaced into the first cavity. According to another embodiment, one or more of the rear sleeve member 10, the rear closure member 14, front closure panel 16, and the hinge 8 stretch resiliently as the closure portion 6 is rotated in the direction of increasing angle A, thus stretching the sleeve portion 4 and closure portion 6 over the device 22. According to a further embodiment, both a resilient bumper and a resiliently stretchable portion of the case are provided.

Figure 3B:
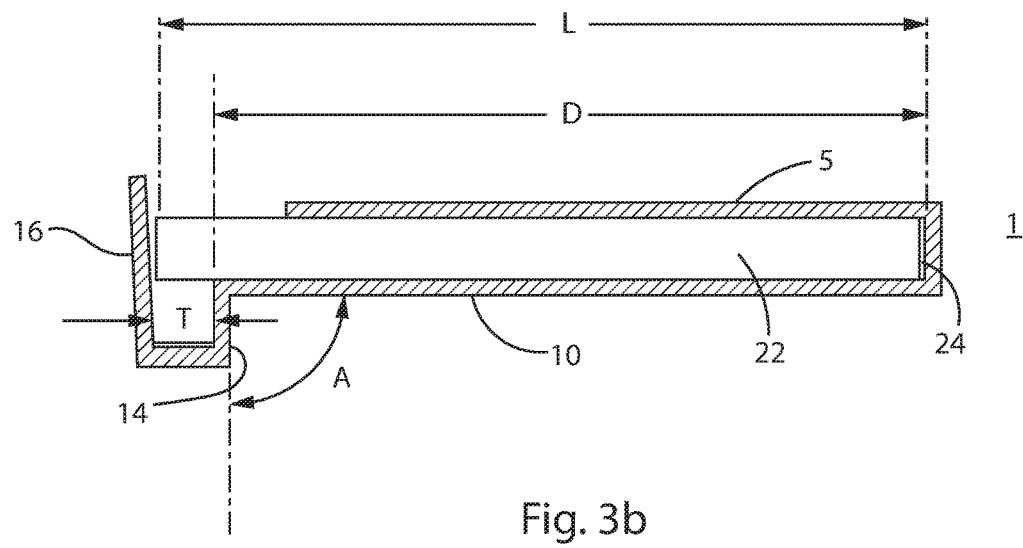

FIG. 3b shows another cross sectional view of the case with the closure portion rotated about hinge 8 with the front closure panel 16 positioned against the edge of the device 22 with the closure portion 6 centered over the protruding end of the device 22. According to one embodiment, angle A is 90 degrees and the point of contact between the engagement portion and the device is at its shortest distance from the bottom of the first cavity. At this position, the force applied to the device by the engagement portion is maximum and the resilient elements (e.g., bumper 24) are at their greatest deformation. With the closure portion in this position, the point of contact between the device 22 and the bottom of the first cavity is D+T. If the length of the device L is greater than or equal to D+T, the bumper 24 must compress or the case must stretch as angle A increase in order to reach the position shown in FIG. 3b. Thus, $$L >= D+T$$

or $$L-D >= T.$$

Figure 3C:
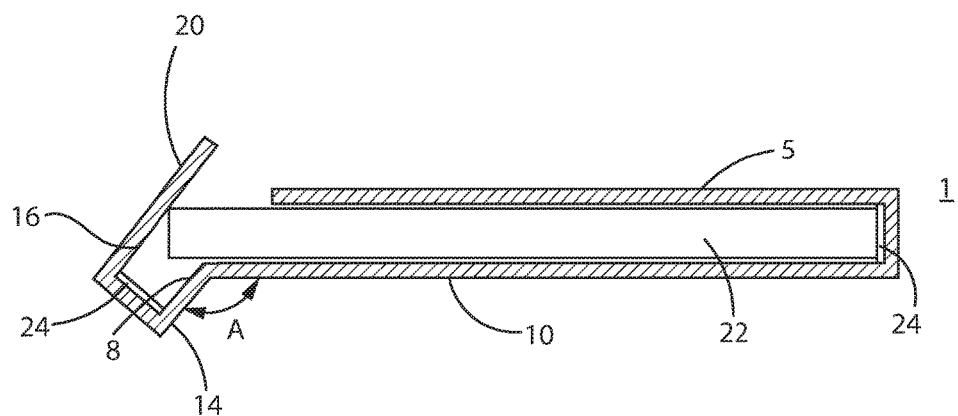

FIG. 3c shows another cross sectional view showing the closure portion 6 rotated about the hinge 8 so that angle A is greater than 90 degrees. The end of the device 22 is positioned partially within second cavity 20 formed by the closure portion 6. In this position, because the closure portion 6 is rotated past the position where it is centered over the end of the device, the distance between the bottom of the first cavity and the point of contact between the closure portion 6 and the bottom interior end of the first cavity 18 increases with increasing angle A. As a result, the force applied by the engagement portion on the device decreases and the resilient element 24 and/or the stretched elements of the closure portion, sleeve portion and/or hinge rebound. Because the closure portion 6 has been rotated "over-center," this rebound forces the closure portion 6 to continue rotating about hinge 8 until the closure portion 6 moves into the fully closed position, illustrated in cross section shown in FIG. 3d. An end of the device 22 extends into the second cavity 20, securing the device within the case. According to a further embodiment, in the fully closed position, closure engagement 17 is pressed against sleeve engagement 19, further securing the device 22 within the case.

According to another embodiment, an engagement mechanism such a pair of ferromagnetic elements, hook-and-loop attachment panels, or an arrangement of snaps or buckles may additionally be provided on the closure engagement 17 and sleeve engagement 19, respectively, to provide increased securement of the closure portion when the case is in the closed position.

Figure 4:
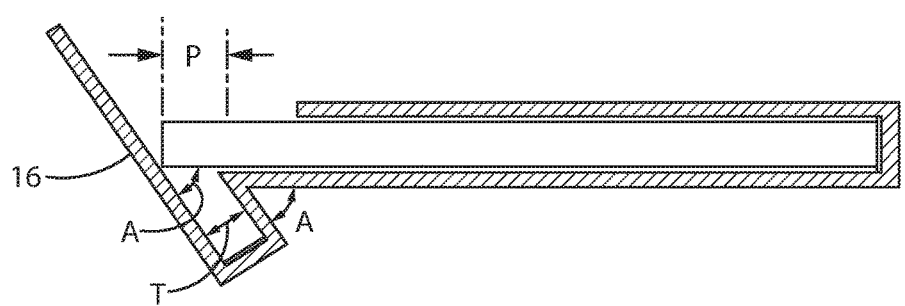
FIG. 4 shows a further cross sectional view of the case according to the embodiment shown in FIG. 1 illustrating the geometric relationship between the components.

The geometric relationship between the case 1 and the device 22 is illustrated in FIG. 4. The first and second cavities 18, 20 are designed to conform to the dimensions of the device. As discussed above with respect to FIG. 3a, when the device 22 is inserted in the first cavity 18, it protrudes by a distance L−D before longitudinal force is applied to compress the bumper 24 or stretch the case. In the position shown in FIG. 4, this is the protrusion distance P. The distance from the axis of rotation of hinge 8 to the inside surface of the front closure panel 16 is the thickness dimension of the second cavity T. A right triangle is formed by the lengths T and P. The relation among these distances and the angle A is:

$$T = P * \sin(A).$$

Thus, in the position shown in FIG. 4 where the distance the device protrudes from the first cavity P is:

$$P = T/\sin(A)$$

As angle A increases from 0 degrees to 90 degrees, sin(A) increases and the protrusion distance P decreases. When A is 90 degrees, as shown for example in FIG. 3b, the distance P is at a minimum since sin(90 degrees) is at its maximum (i.e., 1) and thus P=T. Provided the distance the device protrudes from the first cavity L−D when there is no deformation of resilient elements (e.g., no compression of bumper 24) is greater than or equal to T, the device 22 is forced into the first cavity 18 against the resilient elements. As the hinge 8 rotates past 90 degrees sin(A) decreases, P increases, and the end of the device 22 is pushed into the second cavity by the rebounding of the bumper 24 and/or the return of the stretched sleeve portion, closure portion, and/or hinge to their relaxed length. This creates an over-center engagement between the case 1 and the device 22.

Figure 3D:
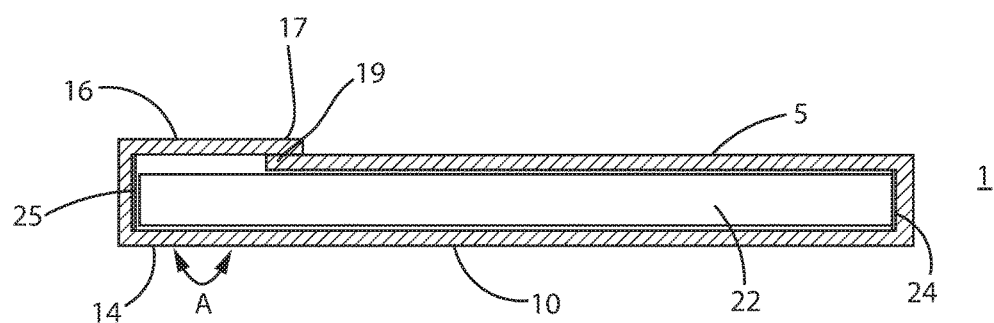

As shown in FIG. 3d, the second cavity 20 formed by the closure portion 6 fits over the protruding end of the device 22. According to one embodiment, the depth of the second cavity 20 is less than or equal to the distance L−D so that the end of the device is held against a bumper 25 on the inside surface of the second cavity 20.

According to one embodiment, the dimensions of the case are selected so that the distance the device extends from the first cavity. L−D is greater than the thickness dimension T of the second cavity According to a further embodiment, a more secure engagement of the closure portion is created by increasing the distance L−D relative to T. The force required to move the closure over the protruding end of the device, however, increases as the distance L−D increases relative to T. In order to effect the movement of the closure over the end of the device, according to one embodiment, the protruding end of the device is a smaller portion of the length of the device in the longitudinal direction, while a larger portion of the length of the device resides within the first cavity.

Dimensions L−D and T are selected to provide a sufficiently secure engagement between the device and the closure portion to maintain the device within the case while allowing the user to conveniently open and close the case. According to a preferred embodiment, T is between about 1 mm and 30 mm when L–D ranges from T to about 40 mm. More preferably T is between about 1 and 15 mm and L–D is between about 20 mm and 30 mm. Most preferably, T is about 7 mm and L–D is about 25 mm.

Figure 5A:
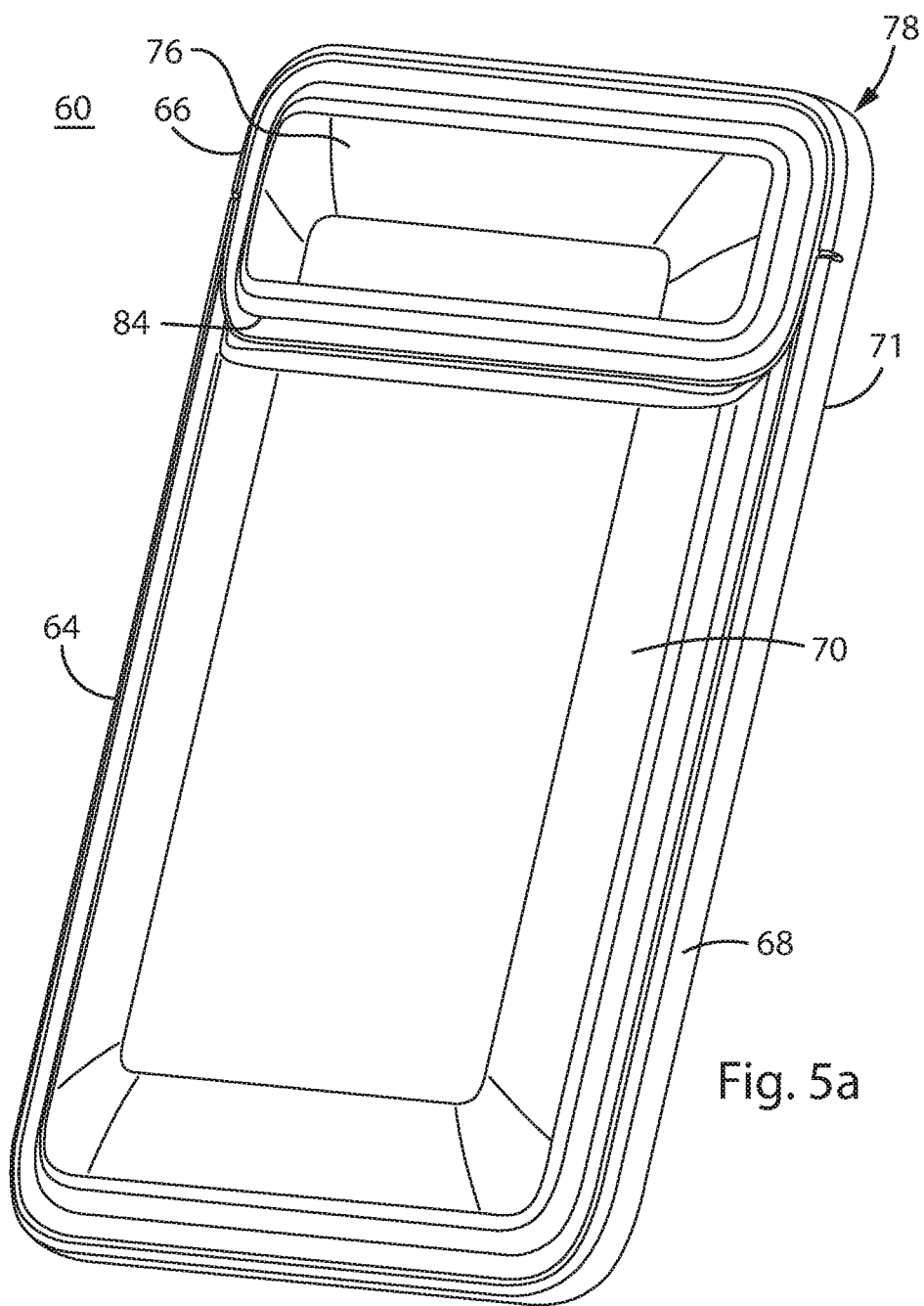
FIG. 5a shows a front perspective view of a further embodiment of the invention.
Figure 5B:
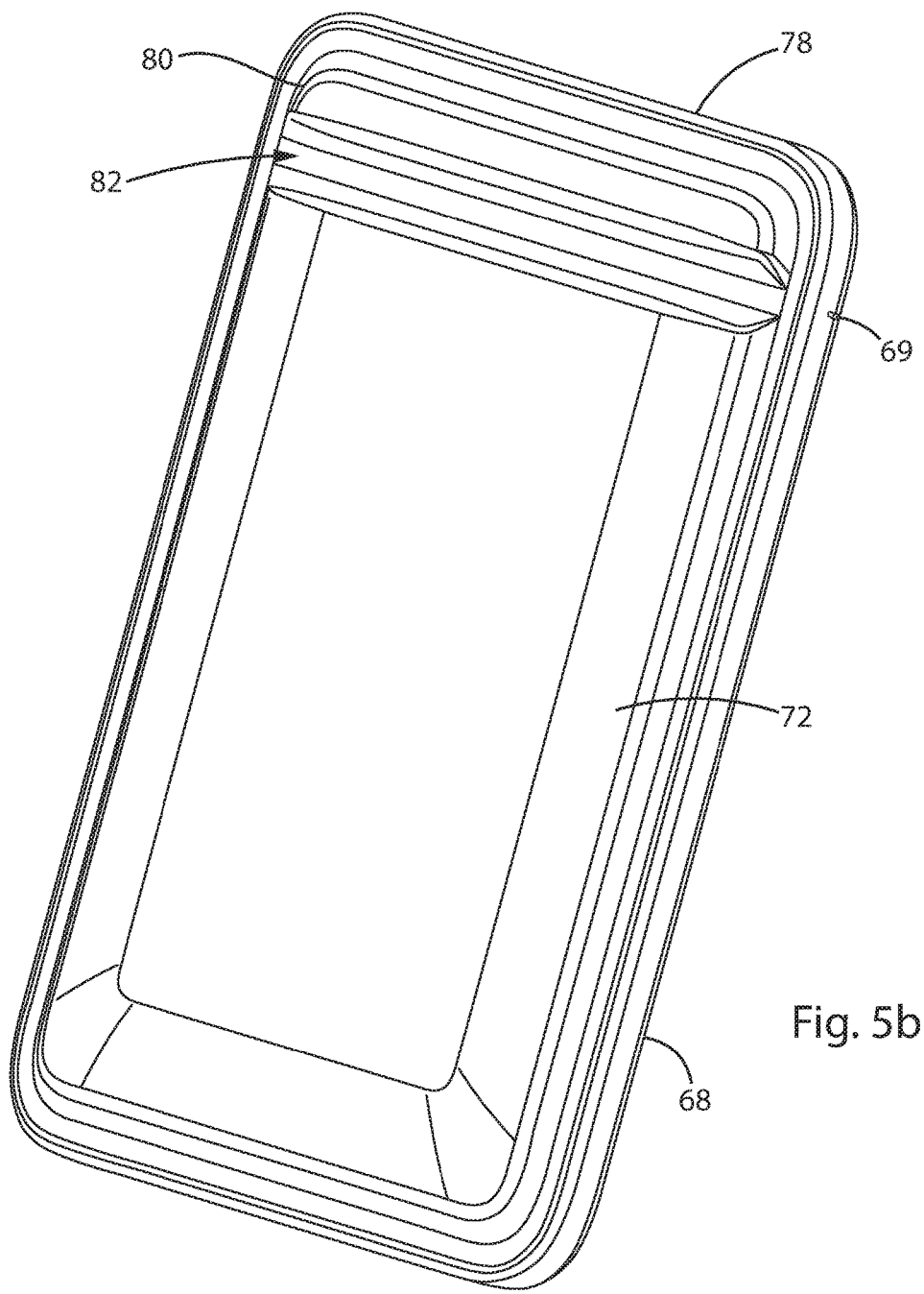
Figure 5C:
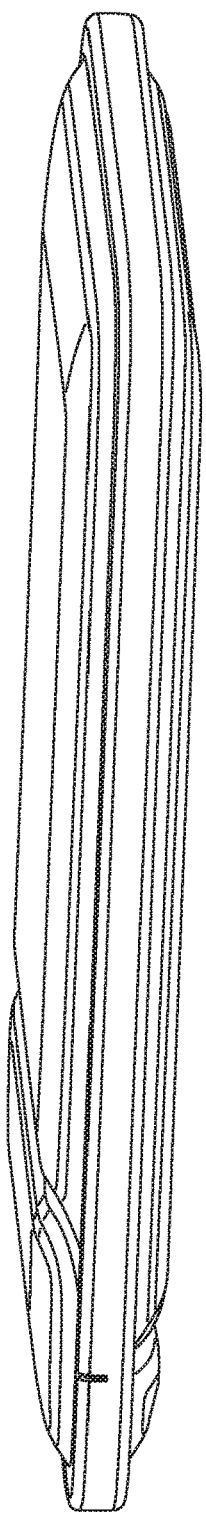

FIGS. 5a and 5b show front and rear perspective views, respectively, of another embodiment of the invention. FIG. 5c is a side perspective view. Case 60 is formed from a sleeve portion 64 and closure portion 66. As shown in FIG. 5a, the sleeve portion 64 includes a front sleeve panel 70 affixed to a sleeve perimeter portion 68. As shown in FIG. 5b, the sleeve portion 64 includes a rear sleeve panel 72 also affixed to the sleeve perimeter portion 68. The front sleeve panel 70, rear sleeve panel 72, and sleeve perimeter portion 68 form a cavity, such as the first cavity 18 discussed above with respect to FIGS. 1-4. The closure portion 66 is formed by a front closure panel 76 affixed along the edge of a closure perimeter portion 78 as shown in FIG. 5a. A rear closure panel 80 is likewise affixed to the perimeter of the closure perimeter portion 78 as shown in FIG. 5b. A hinge 82 connects the rear closure panel 80 and the rear sleeve panel 72. When the case is in a closed configuration, as shown in FIGS. 5a, 5b, and 5c, the sleeve perimeter portion 68 and closure perimeter portion 78 abut one another at either end of the hinge 82. According to the embodiment shown in FIGS. 5a and 5b, the perimeter portions 68, 78 are formed from a single piece of material with slits 69, 71 at either end of hinge 8. The material forming the perimeter position is sufficiently flexible that when hinge is rotated, the part of the perimeter portion adjacent to slits 69, 71 bends to allow the hinge to open. As shown in FIG. 5a, the front closure panel 76 includes an engagement portion 84. When the closure 66 is rotated about the hinge 82 to the closed position, the engagement portion 84 is adjacent the front sleeve panel 70.

According to one embodiment, the rear closure panel 80 and rear sleeve panel 72 are formed from a single piece of material, with hinge 82 formed as a flexible region between the sleeve 64 and the closure 66. According to another embodiment, the hinge is formed by a thinner region of the single piece of the material forming the rear closure panel and rear sleeve panel. According another embodiment, the rear closure panel and rear sleeve panel are formed independently and connected to one another by a separate hinge.

As shown in FIG. 5b, the rear sleeve panel 72 and rear closure panel 80 are thicker than the region adjoining the hinge 8 thus forming a gap on either side of the hinge. This arrangement allows the closure portion to rotate about the axis of hinge 82 so that the thicker portions of the panels 72, 80 do not interfere with one another.

According to one embodiment, the panels forming the sleeve portion and closure portion are made from a compliant material that allows the case to conform to the shape of the device. This material can be fabric, molded elastomer, rubber, silicone, or a foam such as neoprene, EVA, or SBR. According to a preferred embodiment, the panels are formed from a urethane foam covered by a flexible material such as a Lycra fabric. According to another preferred embodiment, the material covering the outside surfaces of the panels is a wear resistant material, such as Cordura™ nylon. According to another preferred embodiment the material covering the inside surfaces of the panels is a soft material such as microfiber that reduces scratching of the surface of an inserted device. According to another embodiment, the panels are formed from a rigid or semi-rigid material such as metal, hard polymer, a composite, and the like. According to a further embodiment, the materials forming the panels and the perimeter portions may be formed from a water resistant or waterproof material.

The perimeter portions 68, 78 may be formed from the same or from different materials as the panels 70, 76, 72, 80. According to one embodiment, the perimeter portions are formed from a resilient material that protects the edges of the device from impact. According to a preferred embodiment, the perimeter portions are formed from a molded polyurethane foam.

The panels may be connected to the perimeter portions by a variety of means including by sewing, welding, adhesive bonding, or by co-molding or over-molding. Where panels are formed from water resistant or waterproof materials, the panels may be joined to the perimeter portions by means that form a water resistant or waterproof joint, such as by welding, adhesive bonding, co-molding, or over-molding.

Figure 6:
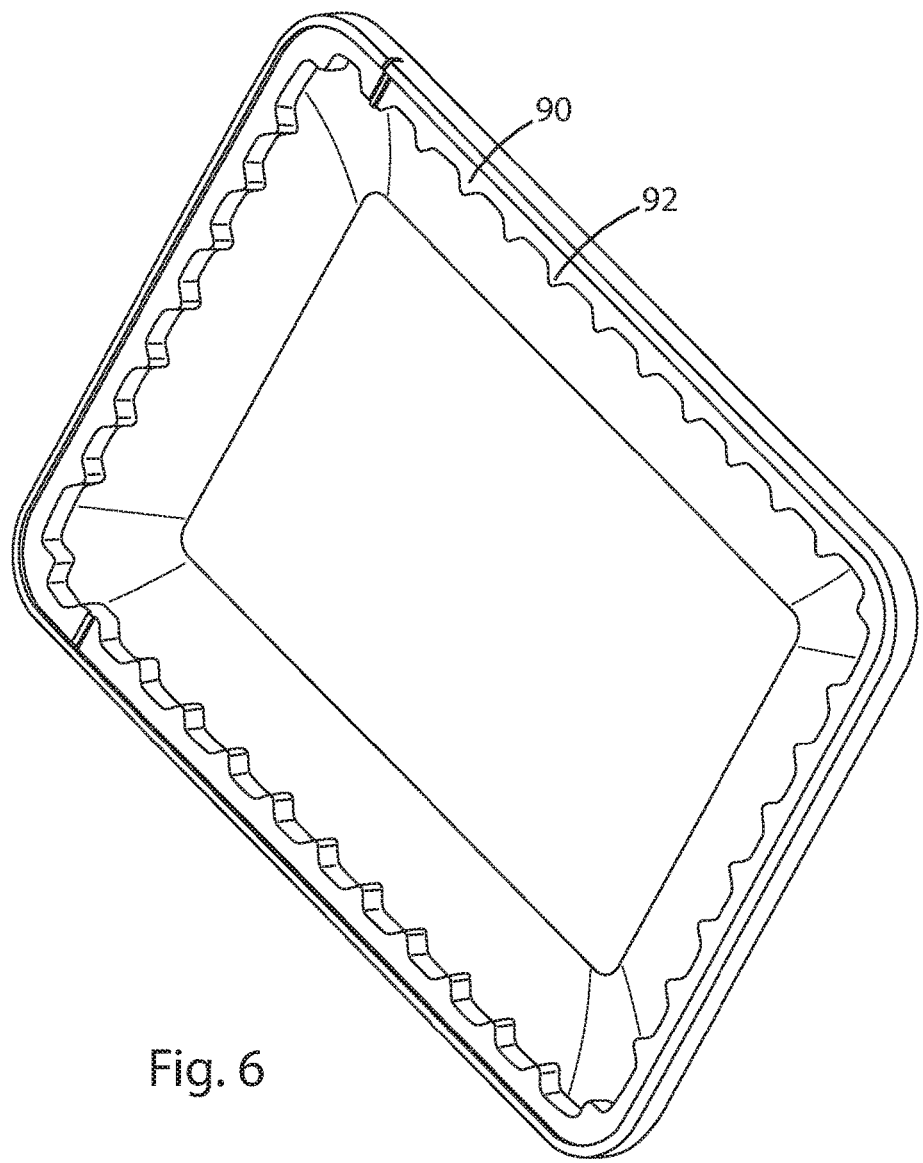
FIG. 6 shows a perspective view of the interior of another embodiment of the invention.

FIG. 6 shows a portion of a case according to a further embodiment of the invention, such as the one shown in FIGS. 5a-5c, with the front sleeve panel 70 and front closure panel 66 removed to show the interior of the case. A bumper 90 is disposed along the inner perimeter. Bumper 90 made be formed from a variety of resilient materials to provide impact protection for the device including injection molded foams, die cut foams, compression molded foams, injection molded elastomers, rubber, silicone, co-molded rubber and hard plastic components, and combinations thereof. The bumper 90 may be formed from the same material that forms the perimeter portions 68, 78 discussed with respect to FIGS. 5a, 5b, and 5c or may be a separate component affixed to an inner perimeter of perimeter portions 68, 78.

The bumper may include protrusions 92 that extend inward. According to one embodiment, these protrusions are shaped to enhance impact protection. As shown in FIG. 6, the protrusions are triangular, with an apex that contact the edge of the device. Other shaped protrusions could also be used, including rounded, square, or rectangular shapes.

Figure 7:
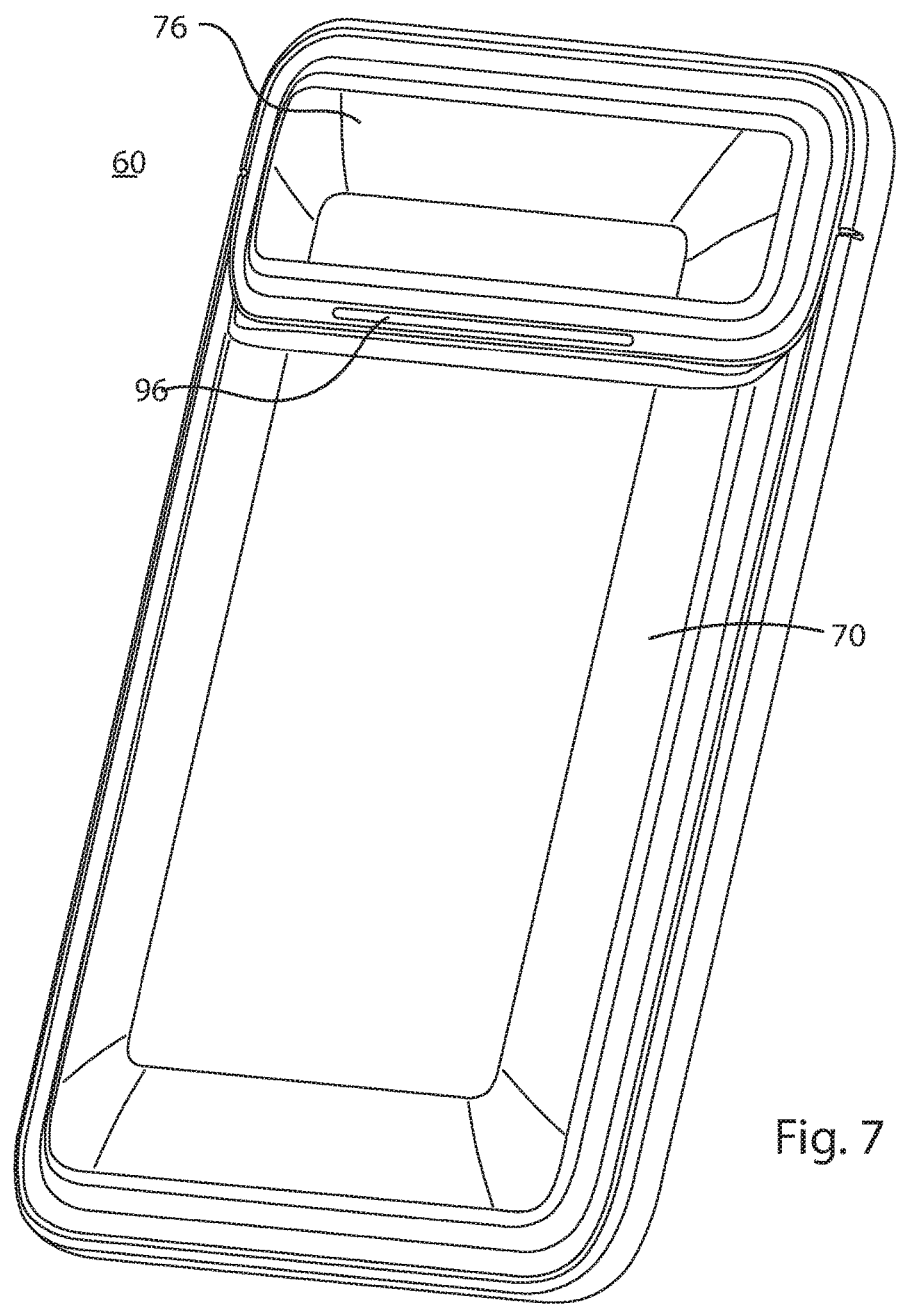
FIG. 7 shows a front perspective view of yet another embodiment of the invention.

FIG. 7 shows a further embodiment of the invention. In addition to the over-center engagement of the closure portion with the device, the embodiment shown in FIG. 7 includes latching components 96 disposed on the overlapping surfaces of the closure 76 and front sleeve panel 70. According to one embodiment the latching components are a pair of ferromagnetic strips disposed on facing portions of the front sleeve panel 70 and front closure panel 76. According to another embodiment, the latching components are patches of hook-and-loop material disposed on facing portions of the front sleeve panel 70 and front closure panel 76. When the case is in the closed position, engagement of the ferromagnetic strips or hook-and-loop material patches hold the respective panels together. This latching mechanism provides additional securing force to hold the case closed and also functions to keep the case closed when no device is inserted. The latching components could also be an arrangement of snaps or buckles to mechanically attach the front sleeve panel 70 and front closure panel 76 to one another.

Figure 8A:
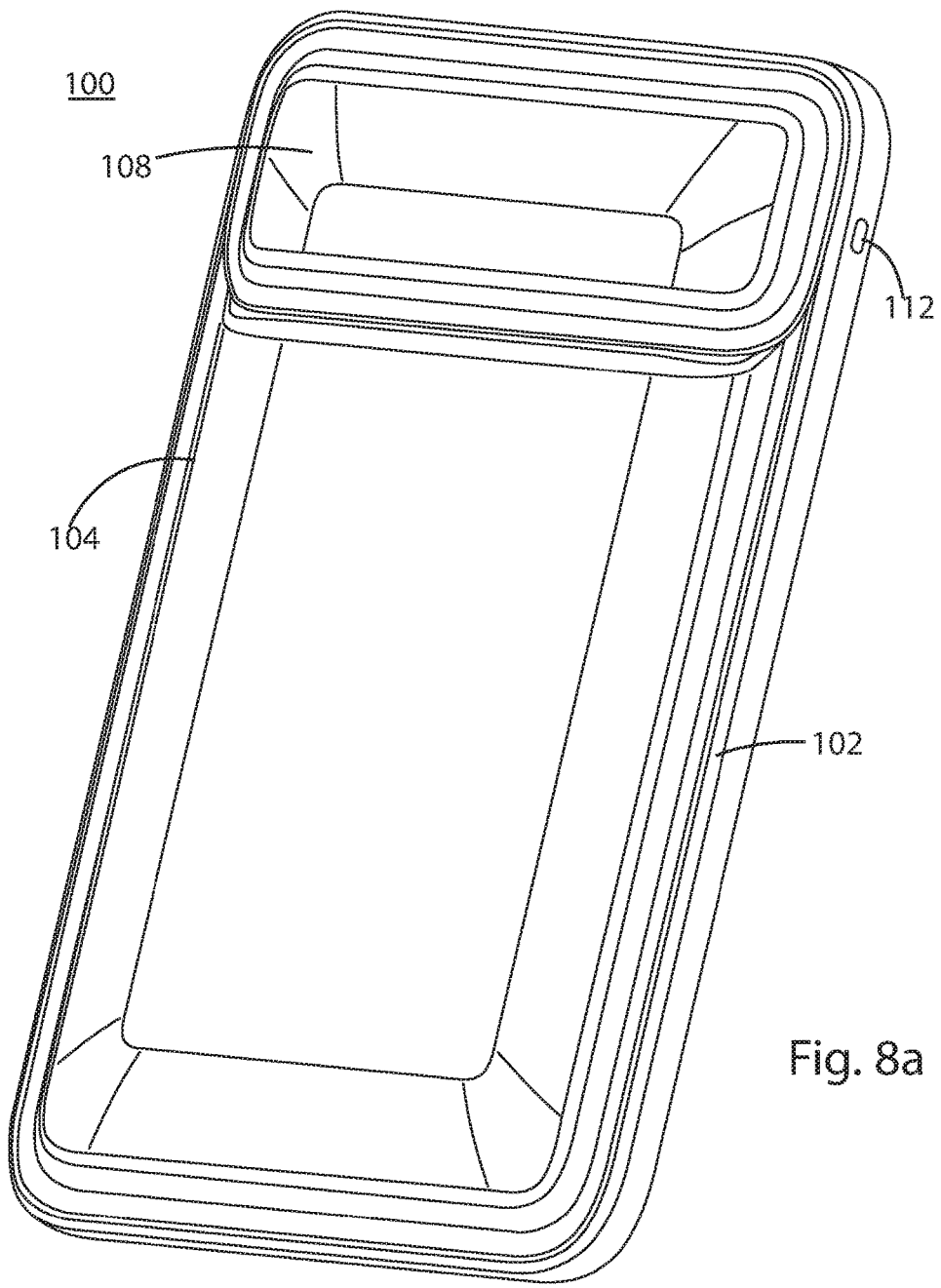
FIG. 8a shows a front perspective view of a further embodiment of the invention.
Figure 8B:
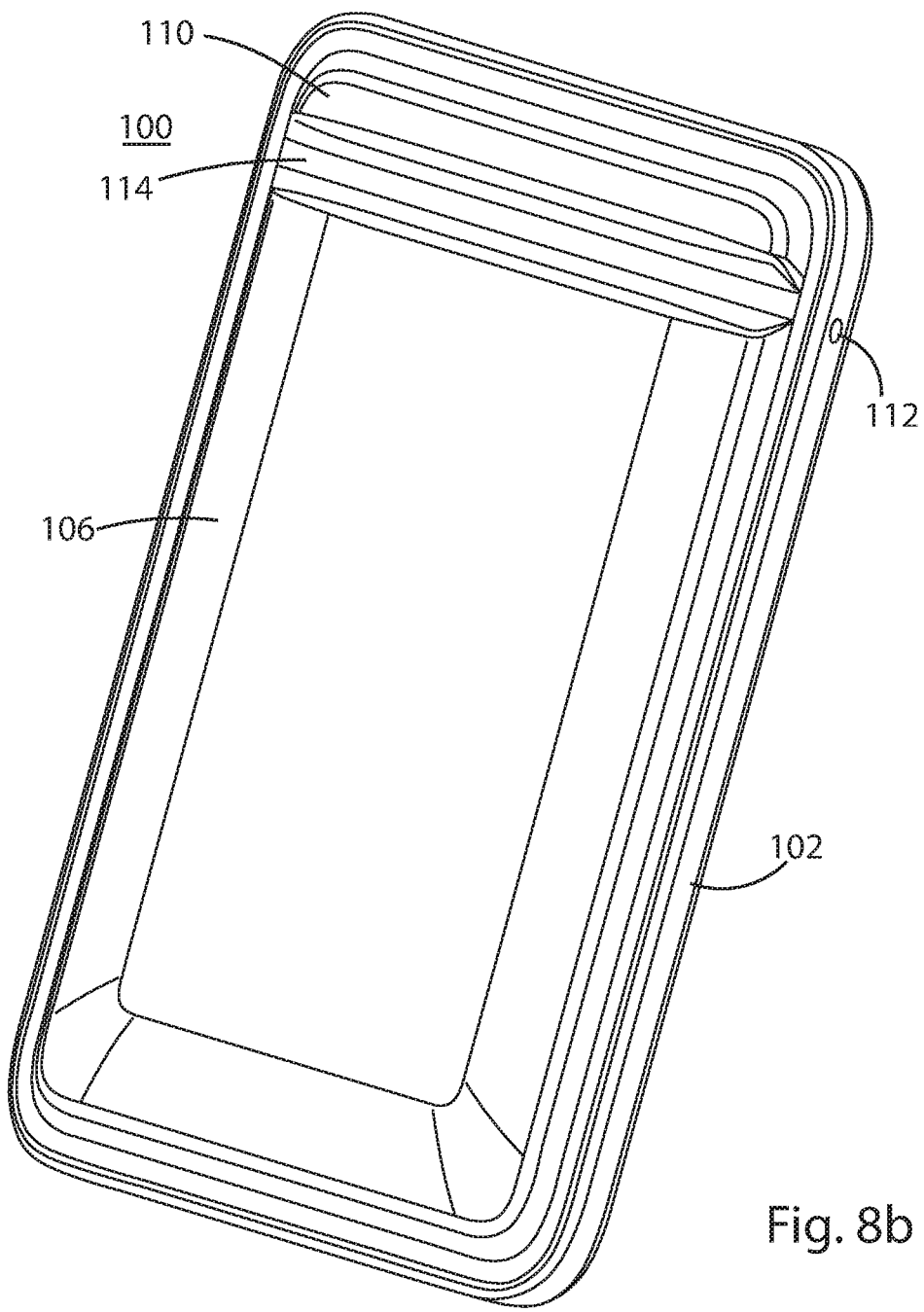
Figure 8C:
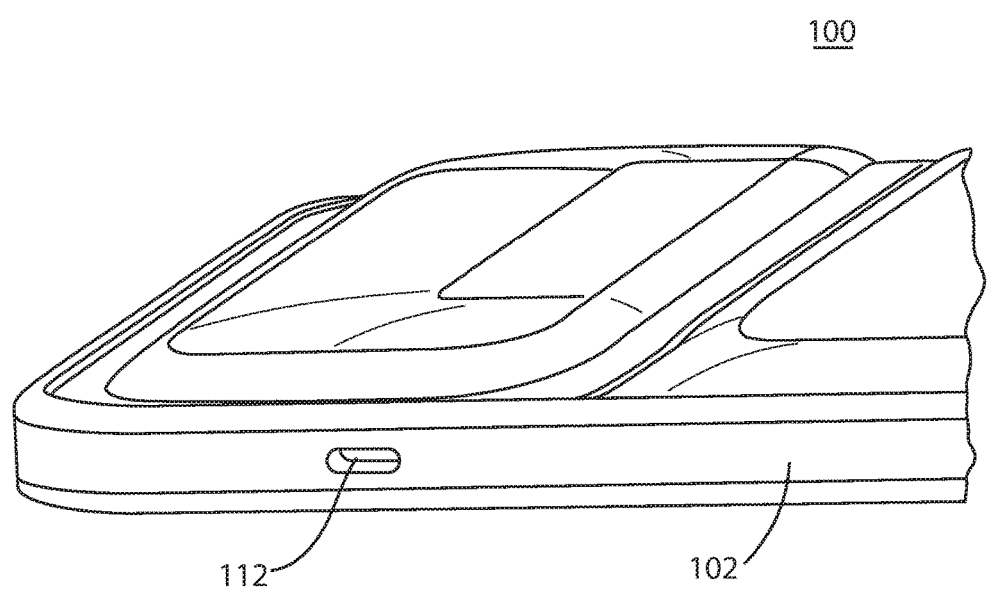

FIGS. 8a, 8b, and 8c show front perspective, rear perspective, and detailed side perspective views of a further embodiment of the invention. The case 100 is formed from a perimeter portion 102 made from a resiliently deformable material such as molded polyurethane foam connected with a front sleeve panel 104, rear sleeve panel 106, front closure panel 108, and rear closure panel 110. A hinge 114 connects the rear sleeve panel 106 with rear closure panel 110. Through holes 112 are provided in the perimeter portion 102 proximal to either end of the hinge 114. The case is opened by moving the rear closure panel relative to the rear sleeve panel 110, causing the hinge 114 to flex. Through holes 112 allow the perimeter portion 102 to bend in response to flexing of the hinge 114. According to one aspect of the invention, the through holes partially or fully collapse as the hinge 114 is flexed. According to another aspect of the invention, the through holes 112 allow the perimeter portion 102 to more easily stretch in the area of the hinge when the hinge 114 is flexed.

Flexing the hinge 114 exposes the cavity formed by the front and rear sleeve panels 104, 106. A device is inserted into this cavity with a portion of the device protruding from the sleeve as discussed with respect to the previous embodiments. The hinge 114 and through holes 112 are positioned so that an over-center engagement is formed between the front and rear closure portions 108, 110 and the device.

FIGS. 9a-9e show another embodiment of the invention. Case 150 is formed in a manner similar to the previous embodiment. A perimeter portion 168 is made from a resiliently deformable material such as molded ethylene vinyl acetate (EVA). The perimeter portion 168 is connected with a front sleeve panel 170, rear sleeve panel 172, front closure panel 176, and rear closure panel 180. The panels may be formed from the materials identified in previous embodiments. A hinge 181 connects the rear sleeve panel 172 with rear closure panel 180. Through holes 169 are provided in the perimeter portion 168 proximal to either end of the hinge 181. These holes 169 allow the perimeter portion 168 to flex along with the hinge 181. Alternatively, slits may be provided in place of through holes.

Figure 9A:
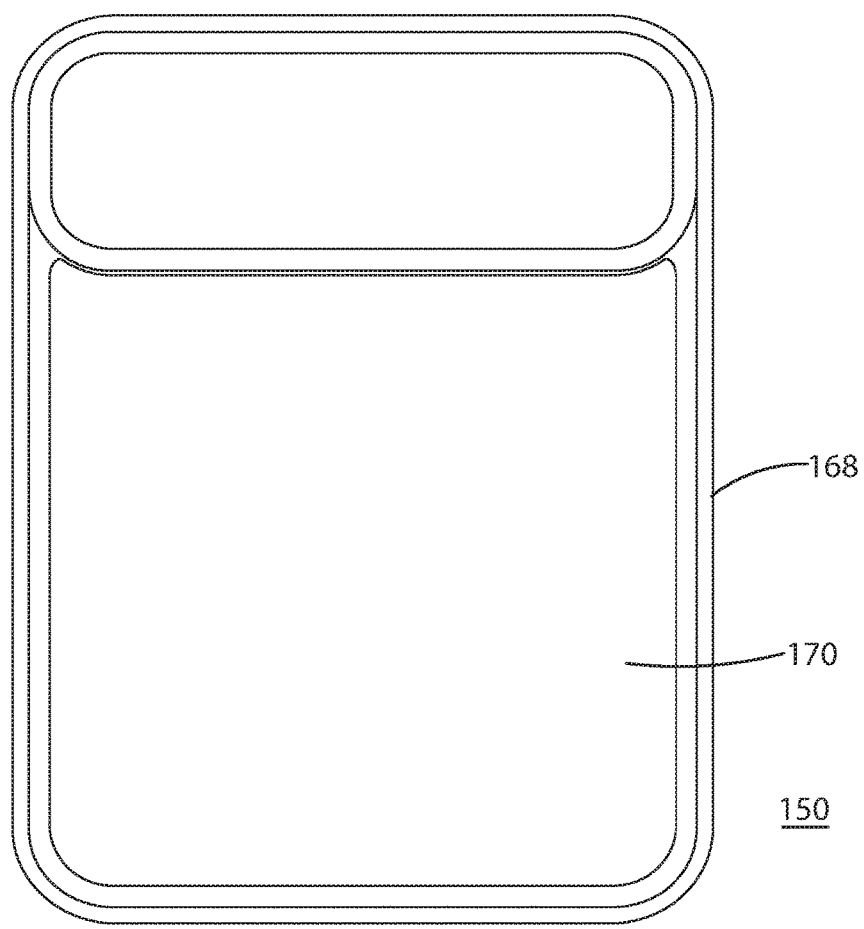
FIG. 9a shows a front view of yet another embodiment of the invention.
Figure 9B:
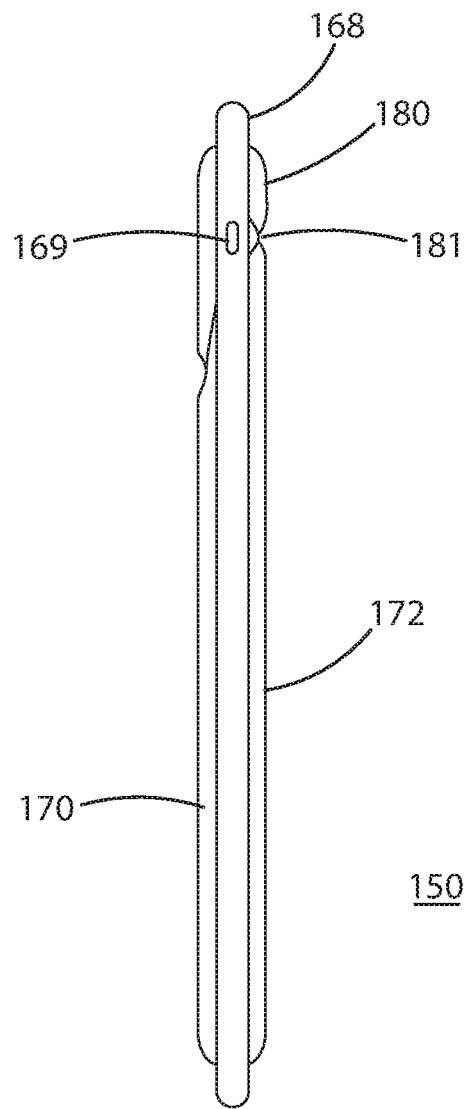
Figure 9C:
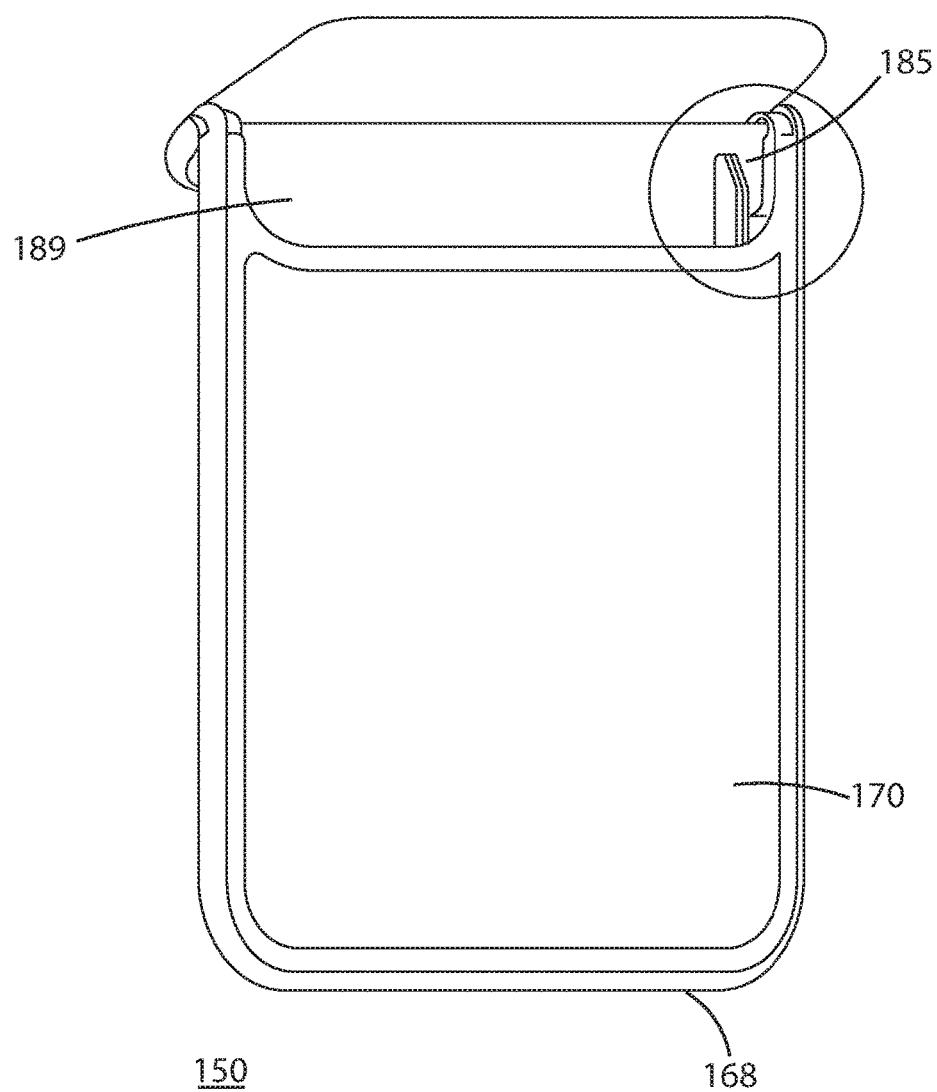

The case is opened by moving the rear closure panel 180 relative toward the rear sleeve panel 172, causing the hinge 181 to flex. FIG. 9c shows the case in the opened configuration. The case 150 according to this embodiment may or may not include the closure mechanisms identified above, including having an over-center engagement with a device within the case and/or other latching components.

As shown in FIG. 9c, flexing the hinge 181 exposes the device cavity 189 formed by the front and rear sleeve panels 170, 172 a well as the opening of stylus cavity 185. The stylus cavity is connected with the perimeter portion 168. As shown in the detailed view in FIG. 9d, a stylus 187 can be positioned within the stylus cavity 185. When the case 150 is opened, as shown in FIG. 9c, the stylus 187 can be drawn out of and inserted into the stylus cavity.

Figure 9D:
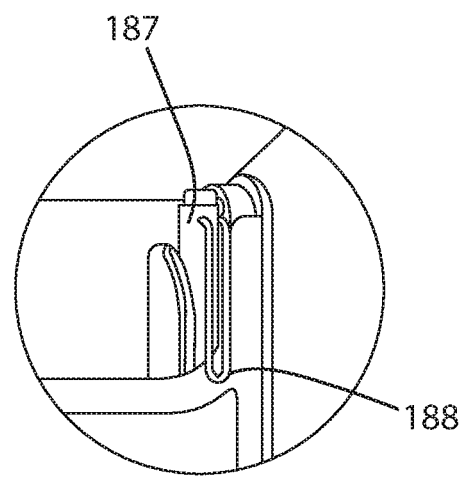
FIG. 9d shows a detailed view of a portion of the embodiment shown in FIG. 9a corresponding to the circled region in FIG. 9c.
Figure 9E:
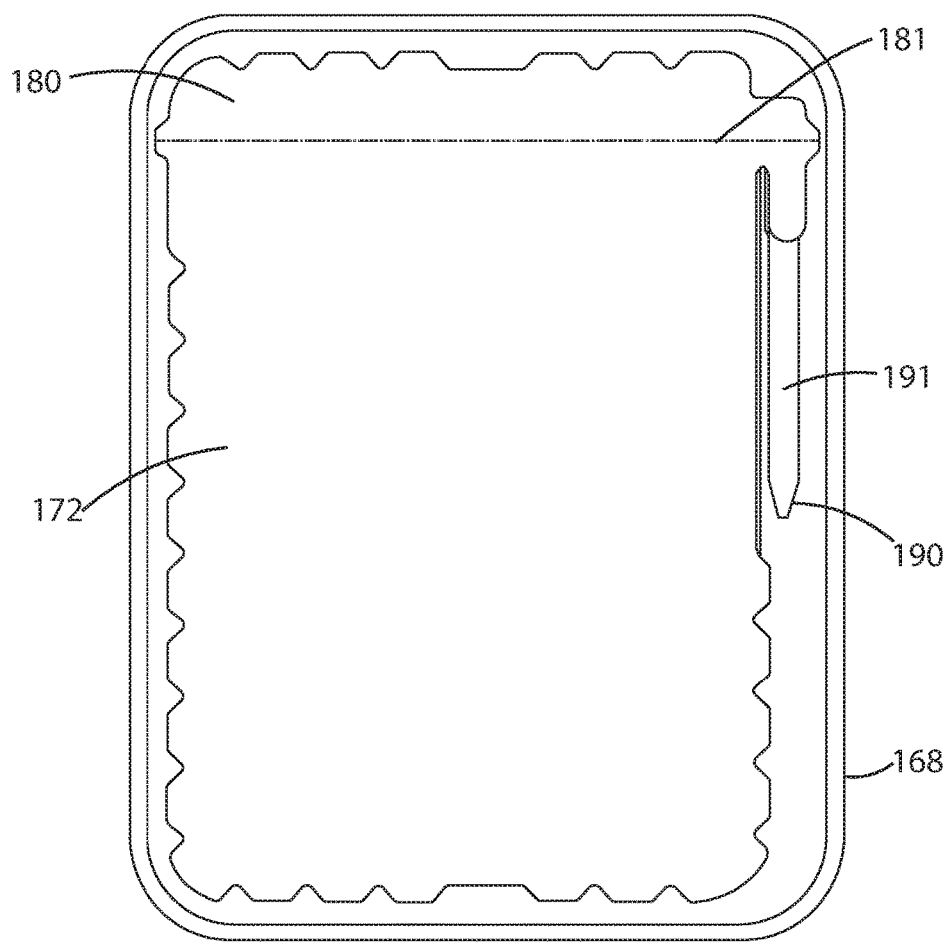
FIG. 9e shows an interior view of the embodiment shown in FIG. 9a without a front panel.

FIG. 9e shows a view of the interior of the case 150 with the front sleeve panel removed. Stylus cavity 185 is formed by an extension of the perimeter portion 168. According to one aspect of the invention, the diameter of the stylus cavity 185 is smaller that the diameter of the stylus so that the material surrounding the cavity resiliently deforms as the stylus 187 is inserted into the cavity 185. This provides a friction fit between the stylus 187 and the cavity 185 to retain the stylus until the user pulls it from the cavity. A snug fit between the stylus 187 and stylus cavity 185 prevents the stylus from inadvertently falling out. As a result, the security of the stylus 187 in the cavity 185 does not depend on the stylus clip 188 engaging the case. Thus, the stylus is retained in the case, even if the clip 188 is damaged. The depth of the stylus cavity 185 is less than the length of the stylus 187 so that, when the stylus is fully inserted into the cavity 185, the end of the stylus, as shown in FIG. 9d, extends out of the cavity, allowing the user to easily grasp it and pull it from the cavity.

According to a further embodiment of the invention, the portion of the stylus cavity 185 corresponding to the tip of the stylus 187 includes a clearance region 190. This region 190 forms an opening larger than the nib of the stylus. Region 190 creates a gap between the tip of the stylus and the end of the stylus cavity 185 so that when the stylus 187 is fully inserted into the stylus cavity 185 the tip of the stylus 187 is separated from the end of the cavity. This prevents the nib of the stylus 187 from being damaged by being pressed against the end of the cavity.

According to one embodiment of the invention, the stylus cavity 185 is permanently joined with the perimeter portion 168. According to one aspect, the perimeter portion and stylus cavity are formed from a single material by injection molding, compression molding, or other molding technique. According to another aspect of the invention, the stylus cavity is formed as a separate component and joined to the perimeter portion by co-molding. According to a further aspect, the perimeter portion and the stylus cavity are formed as separate pieces and joined by adhesive bonding, fasteners, welding or other know technique. According to another aspect of the invention, the perimeter portion 168 and the stylus cavity are formed from EVA, injection molded foam, die cut foam, compression molded foam, injection molded elastomer, rubber, silicone, co-molded rubber and hard plastic components, and combinations thereof. As shown in FIG. 9e, stylus cavity 185 is formed by an extension of the perimeter portion 168. According to this embodiment, the bottom, sides, and nib end of the stylus cavity are formed by a trough 191 formed in the perimeter portion. When the case is assembled, front sleeve panel 170 is fitted over the trough 191 to create the cavity 185. According to another embodiment of the invention, the stylus cavity 185 is formed around its entire circumference by the material of the perimeter portion 168.

Figure 10A:
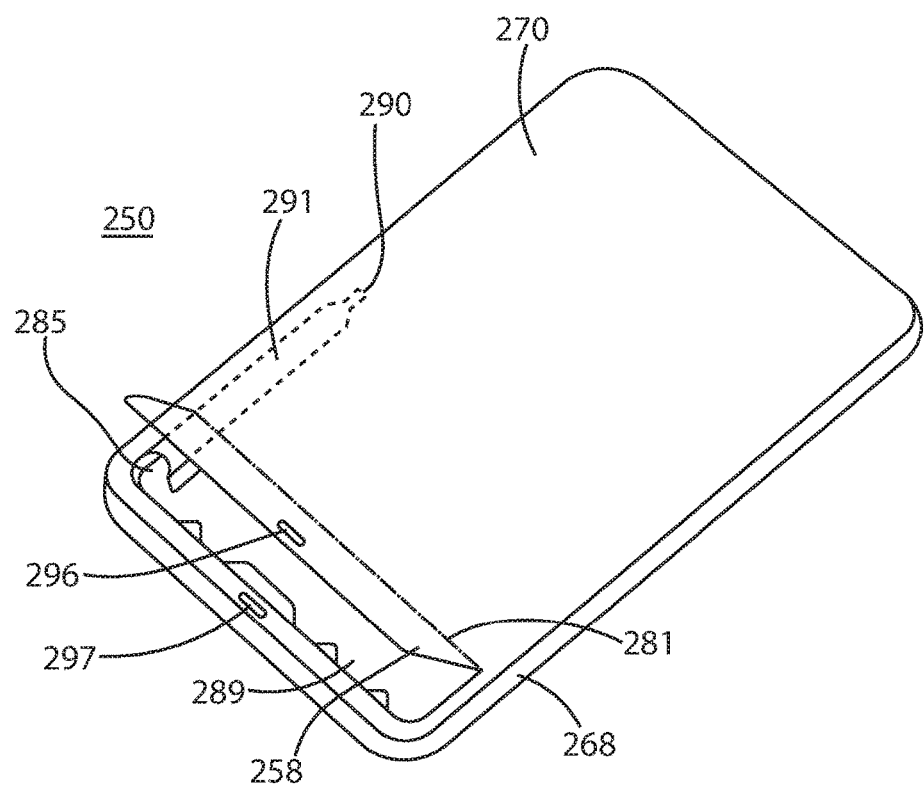
FIG. 10a shows a perspective view of another embodiment of the invention.
Figure 10B:
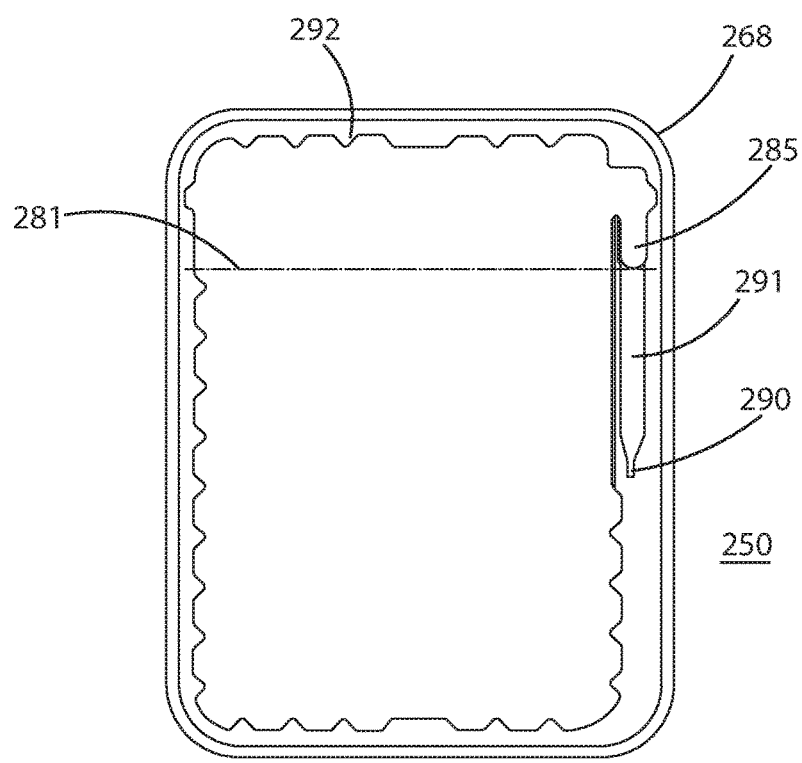
FIG. 10b shows an interior view of the embodiment shown in FIG. 10a without a front panel.

FIGS. 10a and 10b show another embodiment of the invention. Case 250 is formed by perimeter portion 268 made be made from a resiliently deformable material such as molded ethylene vinyl acetate (EVA). Alternatively, perimeter portion may be made from a rigid or semi-rigid material. Perimeter portion 268 may include a bumper along its inner peripheral surface, as described above with respect to FIG. 6. The perimeter portion 268 may include protrusions 292 that extend inward. The perimeter portion 268 is connected with a front panel 270 along a side of the perimeter portion opposite opening 289 and portions of the sides of the perimeter portion on either side of opening 289. A closure panel 258 adjacent opening 289 can be moved away from the perimeter portion 268, as will be described below. A rear panel, which is on the underside of the view shown in FIG. 10a, is connected with the perimeter portion 268 about the whole perimeter of the perimeter portion. The front panel 270, closure panel 258, and rear panel may be formed from rigid, semi-rigid, or resiliently deformable materials, as discussed above with respect to other embodiments.

A hinge 281 connects front panel 270 and closure panel 258. According to one embodiment front panel 270 and closure panel 258 are formed from a continuous sheet of material and the hinge is created by a section of this sheet that is thinner to allow the sheet to flex, as shown in FIG. 10a. According to another embodiment, the hinge 281 is formed by a separate component that links the portion of the front panel 270 and the closure panel 258.

The case is opened by moving the portion of the closure panel 258 away from the perimeter portion 268, as shown in FIG. 10a. The case is close by moving the closure panel toward the perimeter portion 168. A latching mechanism, such as magnets 296 and 297 may be disposed on the closure panel 258 and perimeter portion, respectively to hold the case in a closed position. Alternatively, the latching mechanism may be formed by interoperating patches of hook-and-loop material may be provided on the mating surfaces of the closure panel and perimeter portion.

As shown in FIG. 10a, flexing the hinge 281 exposes the device cavity 289 formed by the front and rear sleeve panels. A stylus cavity 285 is connected with the perimeter portion 168. A stylus, not shown, can be positioned within the stylus cavity 285. When the case 250 is opened the stylus can be drawn out of and inserted into the stylus cavity.

FIG. 10b shows a view of the interior of the case 250 with the front sleeve panel removed. The location of hinge 281 is illustrated by a dotted line. Stylus cavity 285 is formed by an extension of the perimeter portion 268. Like the embodiment described with respect to FIGS. 9a-9e, the diameter of the stylus cavity 285 is smaller that the diameter of the stylus so that the material surrounding the cavity resiliently deforms as the stylus is inserted into the cavity 285. Also, the depth of the stylus cavity 285 is less than the length of the stylus so that, when the stylus is fully inserted into the cavity 285, the end of the stylus extends out of the cavity, allowing the user to easily grasp it and pull it from the cavity.

Also like the embodiments described with respect to FIGS. 9a-9e, the portion of the stylus cavity 285 corresponding to the tip of the stylus includes a clearance region 290 that creates a gap between the tip of the stylus and the end of the stylus cavity when the stylus is fully inserted into the stylus cavity 285 the tip of the stylus to prevent the nib of the stylus from being damaged by being pressed against the end of the cavity. The stylus cavity 285 is permanently joined with the perimeter portion 268 and may be formed in the manner and using the materials as described with respect to the embodiments discussed with respect to FIGS. 9a-9e.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A case for a device and a stylus comprising:
   a sleeve portion having a sleeve opening;
   a stylus cavity located within the sleeve portion, the stylus cavity having a stylus cavity opening adjacent the sleeve opening;
   a closure portion; and
   a hinge connecting the closure portion to the sleeve portion adjacent the sleeve opening and the stylus cavity opening, the hinge adapted to allow the closure portion to move between a first position away from the sleeve opening and stylus cavity opening to allow the device to be inserted into the sleeve portion and the stylus to be inserted into the stylus cavity, and a second position where the closure portion is positioned over the sleeve opening and stylus cavity opening;
   wherein the closure portion comprises:
      a closure-portion front side configured to cover a portion of a front side of the device when arranged in the case with the closure being in the second position;
      a closure-portion rear side configured to cover a portion of a rear side of the device when arranged in the case with the closure being in the second position;
      a closure-portion top side that connects a top end of the closure-portion front side with a top end of the closure-portion rear side, and which is configured to cover a portion of a top side of the device when arranged in the case with the closure being in the second position;
      a closure-portion left side that connects a left end of the closure-portion front side with a left end of the closure-portion rear side, and which is configured to cover a portion of a left side of the device when arranged in the case with the closure being in the second position; and
      a closure-portion right side that connects a right end of the closure-portion front side with a right end of the closure-portion rear side, and which is configured to cover a portion of a right side of the device when arranged in the case with the closure being in the second position.

2. The case of claim 1, further comprising:
   a perimeter portion forming at least a portion of a perimeter of the case;
   wherein the closure portion is formed by a front closure panel and a rear closure panel connected to a first region of the perimeter portion;
   wherein the sleeve portion is formed by a front sleeve panel and a rear sleeve panel connected with a second region of the perimeter portion; and
   wherein the hinge has an axis located between the first and second regions of the perimeter portion.

3. The case of claim 1, further comprising:
   a perimeter portion forming at least a portion of a perimeter of the case;
   wherein the closure portion is formed by a closure panel rotatably moveable about the hinge toward and away from a first portion of the perimeter portion;
   wherein the sleeve portion is formed by a front sleeve panel and a rear panel connected with the perimeter portion at a second region of the perimeter portion; and
   wherein the hinge has an axis located between the first and second regions of the perimeter portion.

4. The case of claim 1;
   wherein the stylus cavity comprises a resilient surface that conforms to a dimension of the stylus.

5. The case of claim 1;
   wherein the stylus cavity comprises a nib portion, the nib portion shaped to avoid contact with a nib of the stylus.

6. The case of one of claim 2;
   wherein the stylus cavity is connected with an interior edge of the perimeter portion.

7. The case of claim 6;
   wherein the perimeter portion and the stylus cavity are integrally formed from a molded polymer.

8. The case of claim 7;
   wherein the polymer comprises one or more of ethylene vinyl acetate, polyurethane foam, rubber, silicone, co-molded rubber and hard plastic, and combinations thereof.

9. The case of claim 2;
   wherein movement of the hinge from the first position to the second position causes the closure portion to pass over an end of the device to form an over-center engagement with the end of the device;
   wherein the sleeve portion forms a device cavity;
   wherein the device comprises a major portion inserted in the device cavity of the sleeve portion and a minor portion including the end of the device extending from the device cavity when the case is in the first position; and wherein when the hinge is moved from the first position to the second position, the case resiliently deforms to allow the closure portion to pass over the minor portion of the device.

10. The case of claim 9;
wherein the closure portion forms a closure cavity and when the case is in the second position, the minor portion of the device is within the closure cavity.

11. The case of claim 1, further comprising:
a bumper arranged along a portion of an inner peripheral side of the sleeve portion and/or the closure portion.

12. The case of claim 11;
wherein the bumper is compressed in a longitudinal direction when the closure is moved from the first position to the second position.

13. The case of claim 9;
wherein when one or more of the sleeve portion, the closure portion, and the hinge is adapted to stretch in a longitudinal direction when the closure is moved from the first position to the second position.

14. The case of claim 9;
wherein the device has a longitudinal dimension L, the sleeve portion has a depth D, the closure portion forms a closure cavity with an internal dimension equal to T, and wherein L−D is greater than or equal to T.

15. The case of claim 14;
wherein L−D is greater than T.

16. The case of claim 9, further comprising:
a pair of slits formed in the perimeter portion between the first and second regions, one slit at each end of the hinge along the axis of the hinge.

17. The case of claim 9, further comprising:
a pair of through holes formed in the perimeter portion between the first and second regions, one through hole at each end of the hinge along the axis of the hinge.

18. A case for a device comprising:
a sleeve portion having a sleeve opening;
a closure portion; and
a hinge connecting the closure portion to the sleeve portion adjacent the sleeve opening, the hinge adapted to allow the closure to move from a first position away from the sleeve opening to allow the device to be inserted into the sleeve portion and a second position where the closure portion is positionable over an end of the device;
wherein movement of the hinge from the first position to the second position causes the closure portion to pass over the end of the device to form an over-center engagement with the end of the device; and
wherein the closure portion comprises:
a closure-portion front side configured to cover a portion of a front side of the sleeve portion and a portion of a front side of the device when arranged in the case with the closure being in the second position;
a closure-portion rear side configured to cover a portion of a rear side of the device when arranged in the case with the closure being in the second position;
a closure-portion top side that connects a top end of the closure-portion front side with a top end of the closure-portion rear side, and which is configured to cover a portion of a top side of the device when arranged in the case with the closure being in the second position;
a closure-portion left side that connects a left end of the closure-portion front side with a left end of the closure-portion rear side, and which is configured to cover a portion of a left side of the device when arranged in the case with the closure being in the second position; and
a closure-portion right side that connects a right end of the closure-portion front side with a right end of the closure-portion rear side, and which is configured to cover a portion of a right side of the device when arranged in the case with the closure being in the second position.

19. The case of claim 18;
wherein the sleeve portion forms a cavity, wherein the device comprises a major portion inserted in the cavity of the sleeve portion and a minor portion including the end of the device extending from the cavity when the case is in the first position, and wherein when the hinge is moved from the first position to the second position, the case resiliently deforms to allow the closure portion to pass over the minor portion of the device.

20. The case of claim 19;
wherein the closure portion forms a closure cavity and when the case is in the second position, the minor portion of the device is within the closure cavity.

21. The case of claim 18, further comprising:
a bumper arranged along a portion of an inner peripheral side of the sleeve and/or the closure.

22. The case of claim 21;
wherein the bumper is compressed in a longitudinal direction when the closure is moved from the first position to the second position.

23. The case of claim 18;
wherein when one or more of the sleeve portion, the closure portion, and the hinge is adapted to stretch in a longitudinal direction when the closure is moved from the first position to the second position.

24. The case of claim 18;
wherein the closure portion further comprises an engagement surface and wherein the engagement surface contacts a surface of the sleeve portion when the case in the second position.

25. The case of claim 18;
wherein the sleeve is formed from a front panel joined to a rear panel by a peripheral edge.

26. The case of claim 25;
wherein the front panel and the rear panel comprise a compliant material.

27. The case of claim 25;
wherein the front panel and rear panel comprise a rigid material.

28. The case of claim 18;
wherein the sleeve portion and closure portion comprise water resistant materials.

29. The case of claim 18;
wherein the device has a longitudinal dimension L, the sleeve portion has a depth D, the closure portion forms a closure cavity with an internal dimension equal to T, and wherein L−D is greater than or equal to T.

30. The case of claim 29;
wherein L−D is greater than T.

31. The case of claim 18;
wherein the closure portion is formed by a front closure panel and rear closure panel connected to a peripheral portion at a first region of the peripheral portion, wherein the sleeve portion is formed by a front sleeve panel and rear sleeve panel connected with the peripheral portion at a second region of the peripheral portion, and wherein the hinge has an axis located between the first and second regions of the peripheral portion.

32. The case of claim 31, further comprising:
a pair of slits formed in the peripheral portion between the first and second regions, one slit at each end of the hinge along the axis of the hinge.

33. The case of claim 31, further comprising:
a pair of through holes formed in the peripheral portion between the first and second regions, one through hole at each end of the hinge along the axis of the hinge.

34. The case of claim 31;
wherein one or more of the rear sleeve panel and the rear closure panel are thicker than the hinge.

35. The case of claim 18;
wherein the sleeve portion comprises a rear sleeve member and a front sleeve panel connected along respective portions of their perimeter edges to form the sleeve opening and a sleeve cavity, wherein the closure portion comprises a rear closure member and a front closure panel connected along respective portions of their perimeter edges to form a closure opening and a closure cavity, and wherein the hinge connects the rear sleeve member to the rear closure member along respective edges of the sleeve opening and closure opening.

36. The case of claim 35;
wherein the first closure panel is longer in a longitudinal direction than the rear closure member and wherein, when the hinge is in the second position a portion of the front closure panel overlaps a portion of the front sleeve panel.

37. The case of claim 35;
wherein a contiguous rear panel forms the rear surfaces of the rear sleeve member and rear closure member and wherein the hinge is formed by a flexible hinge line of the contiguous rear panel.

\* \* \* \* \*